United States Patent
Hying

(10) Patent No.: US 8,547,031 B2
(45) Date of Patent: Oct. 1, 2013

(54) CIRCUIT CONFIGURATION AND METHOD FOR OPERATING AT LEAST ONE FIRST AND ONE SECOND LED

(75) Inventor: Ralf Hying, Munich (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 208 days.

(21) Appl. No.: 13/002,521

(22) PCT Filed: Jul. 4, 2008

(86) PCT No.: PCT/EP2008/058698
§ 371 (c)(1),
(2), (4) Date: Jan. 4, 2011

(87) PCT Pub. No.: WO2010/000333
PCT Pub. Date: Jan. 7, 2010

(65) Prior Publication Data
US 2011/0109246 A1     May 12, 2011

(51) Int. Cl.
*H05B 37/00*     (2006.01)
(52) U.S. Cl.
USPC ............................ 315/224; 315/307; 315/308
(58) Field of Classification Search
USPC ............. 315/224, 307, 308, 225, 223, 209 R, 315/291
See application file for complete search history.

(56) References Cited

U.S. PATENT DOCUMENTS

| | | | |
|---|---|---|---|
| 6,825,619 B2* | 11/2004 | Norris | 315/149 |
| 7,714,517 B2 | 5/2010 | Shih et al. | |
| 2002/0048177 A1* | 4/2002 | Rahm et al. | 362/555 |
| 2002/0105373 A1 | 8/2002 | Sudo | |
| 2003/0227261 A1 | 12/2003 | Shimizu | |
| 2004/0196225 A1 | 10/2004 | Shimada | |
| 2007/0279104 A1 | 12/2007 | Satoh | |
| 2008/0116817 A1 | 5/2008 | Chao et al. | |
| 2009/0184663 A1 | 7/2009 | Reinle | |

FOREIGN PATENT DOCUMENTS

| | | |
|---|---|---|
| CN | 1909048 A | 2/2007 |
| CN | 101197109 A | 6/2008 |
| CN | 101572978 A | 11/2009 |
| DE | 102006037342 A1 | 2/2008 |

(Continued)

OTHER PUBLICATIONS

International Search Report of PCT/EP2008/058698 mailed Mar. 27, 2009.

(Continued)

*Primary Examiner* — David H Vu

(57) ABSTRACT

A circuit configuration may include an operational amplifier having a plus and a minus input and an output; and a current sensing resistor, whereby the voltage drop across the resistor is coupled to the minus input; a first transistor having a control electrode, a reference electrode and a working electrode, the working-reference electrode path of which is coupled in series to a first and second connection for a first LED between a connection for a supply voltage and the reference potential; a second transistor having a control electrode, a reference electrode and a working electrode, the working-reference electrode path of which is coupled in series to a first and second connection for a second LED between a connection for a supply voltage and the reference potential; a first switch and a second switch coupled in series between the output and the control electrode of the first and second transistor, respectively.

13 Claims, 2 Drawing Sheets

(56) References Cited

FOREIGN PATENT DOCUMENTS

| | | |
|---|---|---|
| JP | 2034014 A | 2/1990 |
| JP | 7326796 A | 12/1995 |
| JP | 2003347594 A | 12/2003 |
| JP | 2004253635 A | 9/2004 |
| JP | 2004311635 A | 11/2004 |
| JP | 2006066776 A | 3/2006 |
| JP | 2007150364 A | 6/2007 |

OTHER PUBLICATIONS

English language abstract of JP 7-326 796 A dated Dec. 12, 1995.
English language abstract of JP 2006066776 A dated Mar. 9, 2006.
English language abstract of JP 2-034 014 A dated Feb. 5, 1990.
English language abstract of JP 2003347594 A dated Dec. 5, 2003.
English language abstract of JP 2004253635 A dated Sep. 9, 2004.
English language abstract of JP 2007150364 A dated Jun. 14, 2007.
English abstract of CN101572978A; Nov. 4, 2009.
English abstract of CN1909048A; Feb. 7, 2007.

* cited by examiner

CIRCUIT CONFIGURATION AND METHOD FOR OPERATING AT LEAST ONE FIRST AND ONE SECOND LED

RELATED APPLICATIONS

The present application is a national stage entry according to 35 U.S.C. §371 of PCT application No.: PCT/EP2008/058698 filed on Jul. 4, 2008.

TECHNICAL FIELD

Various embodiments relate to a circuit configuration for operating at least one first and one second LED, having an operational amplifier having a plus and a minus input and an output, a device providing a target value and coupled to the plus input of the operational amplifier, at least one first and one second connection for the first and one first and one second connection for the second LED, whereby the respective first connection is coupled to a connection for a DC supply voltage, whereby the respective second connections are coupled to each other, forming a connection point, and a current sensing resistor coupled in series between the connection point of the second connections and a reference potential, whereby the voltage drop across the current sensing resistor is coupled to the minus input of the operational amplifier. Various embodiments further relate to a corresponding method for operating at least one first and one second LED.

BACKGROUND

Such circuit configurations are employed for example in microdisplay applications for front and rear projection. In this situation it is necessary to turn on and turn off the current flowing through the LEDs and thus the light emitted by the LEDs in the μs range. In this situation, in projection systems which are not situated in the absolute high-end range it can be useful to drive the different channels, which correspond to different colors, successively in time, in other words sequentially. This means that the equipment costs can be considerably reduced because there is no need to provide one power source per channel, but one power source in total can be used for all channels. By preference, this power source is designed for very rapid switching operations in order to achieve the best possible light yield.

FIG. 1 shows a schematic illustration of a generic circuit configuration known from the prior art. In this situation, a linear regulator is used as the power source. This includes the operational amplifier $OPAMP_{lin}$, a feedback resistor $R_{lin,FB}$ arranged between the output of the operational amplifier $OPAMP_{lin}$ and its minus input, and a resistor $R_{lin,gate}$ arranged coupled in series between the output of the operational amplifier $OPAMP_{lin}$ and a power transistor $T_{lin}$ driven in linear fashion used for setting the current strength. The plus input of the operational amplifier $OPAMP_{lin}$ is coupled to a control voltage $U_{in}$ which defines how high is the current to be released by the transistor $T_{lin}$, flowing through the respectively closed switch $S_1$ to $S_n$ and through the respectively assigned diode $D_1$ to $D_n$. The switches $S_1$ to $S_n$ are driven in saturation and must be capable of switching the full current flowing through the LEDs. On the anode side, the diodes $D_1$ to $D_n$ can be coupled to a common supply voltage $U_{supply}$, while on the cathode side, a current sensing resistor $R_{shunt}$ is coupled between the cathode of each diode $D_1$ to $D_n$ and a reference potential. The voltage drop at the current sensing resistor $R_{shunt}$ is coupled to the minus input of the operational amplifier $OPAMP_{lin}$.

The switches $S_1$ to $S_n$ are turned on sequentially by a control circuit which is not shown.

A disadvantage of the circuit configuration shown in FIG. 1 is the fact that it requires elaborate measures for heat dissipation.

SUMMARY

Various embodiments develop a generic circuit configuration or a generic method such that the measures to be taken for heat dissipation can turn out to be simpler and thus more cost-effective.

The invention is based on the knowledge that this object can be achieved if a power transistor is provided in each LED branch, which is used by way of respectively associated switches $S_1$ to $S_n$ as a series regulating transistor for the linear regulator. In this situation, small signal transistors can be used for the switches $S_1$ to $S_n$ because these only need to be designed to handle the current flowing into the control electrode of the power transistors $T_{lin,1}$ to $T_{lin,n}$. The sequential switching of the switches $S_1$ to $S_n$ can take place with the same timing and from the same source as in the prior art.

Whereas in the prior art the considerable power loss, having as a result an elaborate thermal design, essentially occurs at the series regulating transistor $T_{lin}$ and thus centrally at one point, in a circuit configuration according to the invention this power loss is distributed at a plurality of points, namely at the power transistors $T_{lin,1}$, $T_{lin,2}$ etc. A further important advantage results from the fact that in each case only ever one transistor is present in the respectively active branch, whereas in the prior art current through the LED has flown through two transistors in the respectively active branch. Bearing in mind the fact that the collector-emitter saturation voltage of one of the switches $S_1$ to $S_n$ is approximately 500 mV and the currents flowing through the LEDs can be up to 30 A, it becomes clear what vast amounts of power loss are produced in the switches $S_1$ to $S_n$. When three LEDs or LED arrays are used, the circuit configuration known from the prior art moreover requires four power transistors whereas the circuit configuration according to the invention manages with only three power transistors.

The present invention thus enables not only a considerable reduction in measures for dissipating the power loss, moreover it is characterized by a significantly higher level of efficiency and reduces the component costs. As a result of the reduction in the power loss, a longer service life is moreover to be reckoned with for the circuit configuration.

In a preferred embodiment, the first LED is coupled between the reference electrode of the first transistor which can be driven in an analog manner and the reference potential and the second LED is coupled between the reference electrode of the second transistor which can be driven in an analog manner and the reference potential. This gives rise to a so-called common-cathode configuration. Alternatively, provision can be made such that the first LED is coupled between a connection for a supply voltage and the working electrode of the first transistor which can be driven in an analog manner and the second LED is coupled between a connection for a supply voltage and the working electrode of the second transistor which can be driven in an analog manner. This results in a so-called common-anode configuration.

By preference, the first and/or the second electronic switch is implemented as a small signal transistor. This is made possible due to the fact that the first and the second electronic switches only need to provide the gate current for the transistors which can be driven in an analog manner which are preferably implemented as field-effect transistors. The component costs can be further reduced by this means.

The first and/or the second transistors which can be driven in an analog manner are however preferably implemented as power transistors.

By particular preference, the first and the second transistors which can be driven in an analog manner are mounted spaced apart by more than 2 cm, in particular spaced apart by more than 5 cm. This results in the fact that the power loss occurs at least two different locations which are clearly less affected by the power loss of the other transistor in each case than if the two transistors which can be driven in an analog manner are mounted directly next to one another. The measures for dissipating the power loss can be further reduced by this means. If for example a common heat sink is mounted over the first and the second transistors which can be driven in an analog manner, on account of the spacing this results in the heat sink having a large surface area which provides for good heat dissipation.

A feedback network is preferably coupled between the output and the minus input of the operational amplifier. This is used for setting a suitable amplification for the operational amplifier.

In a simplified embodiment, at least two connections for connecting a DC supply voltage are coupled to each other. This corresponds essentially to the approach as in the prior art and offers the advantage that only one DC supply voltage needs to be provided. It is however especially preferable if at least two connections for connecting a DC supply voltage are not coupled to each other, with the result that they can be coupled to different DC supply voltages. It is thereby possible to take into consideration the fact that each diode normally has a different forward voltage. Thus, the forward voltage of a red LED $U_{Fred}$ is approximately 4 V, that of a blue LED $U_{Fblue}$ approximately 6 V and that of a green LED $U_{Fgreen}$ similarly about 6 V. If, as in the prior art, only one supply voltage is available, this would need to be designed to handle about 6.5 V. If the red LED is now to be turned on in the context of the sequential turn-on, then a voltage drop of at least 2 V would need to occur at the transistor associated therewith which can be driven in an analog manner in order to provide the red LED with an appropriate forward voltage. Given a current of 30 A flowing through the red LED, this results in an additional power loss of 60 W, which can be saved in the case of said preferred embodiment if the connections associated with the LEDs for connection of a supply voltage are coupled to supply voltages which are matched to the respective LED. In the present case, for example the connection associated with a red LED would be coupled to a supply voltage of 4.5 V, while the connections associated with a red LED and a blue LED are preferably coupled jointly to a supply voltage of 6.5 V.

Naturally, the at least one first LED can constitute a first LED module and the at least one second LED can constitute a second LED module, each having a plurality of LEDs. In this situation, at least one LED module preferably includes a plurality of single chips each having at least one LED, whereby the single chips are preferably connected in parallel and/or in series.

The preferred embodiments and their advantages presented in respect of the circuit configuration according to the invention apply correspondingly, to the extent to which they may be applicable, to the method according to the invention.

BRIEF DESCRIPTION OF THE DRAWING(S)

Exemplary embodiments of a circuit configuration according to the invention will henceforth be described in detail in the following with reference to the attached drawings.

DETAILED DESCRIPTION

The following detailed description refers to the accompanying drawings that show, by way of illustration, specific details and embodiments in which the invention may be practiced.

Figure 1:
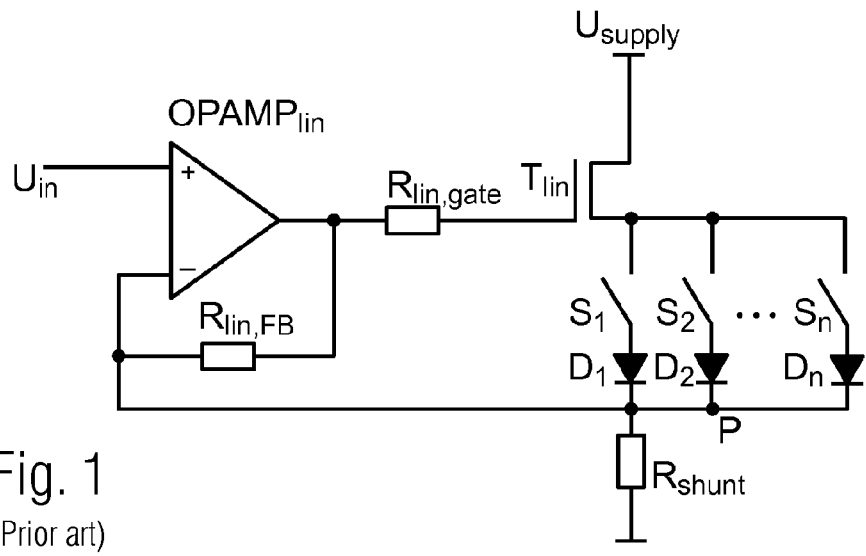
FIG. 1 shows a generic circuit configuration known from the prior art.
Figure 2:
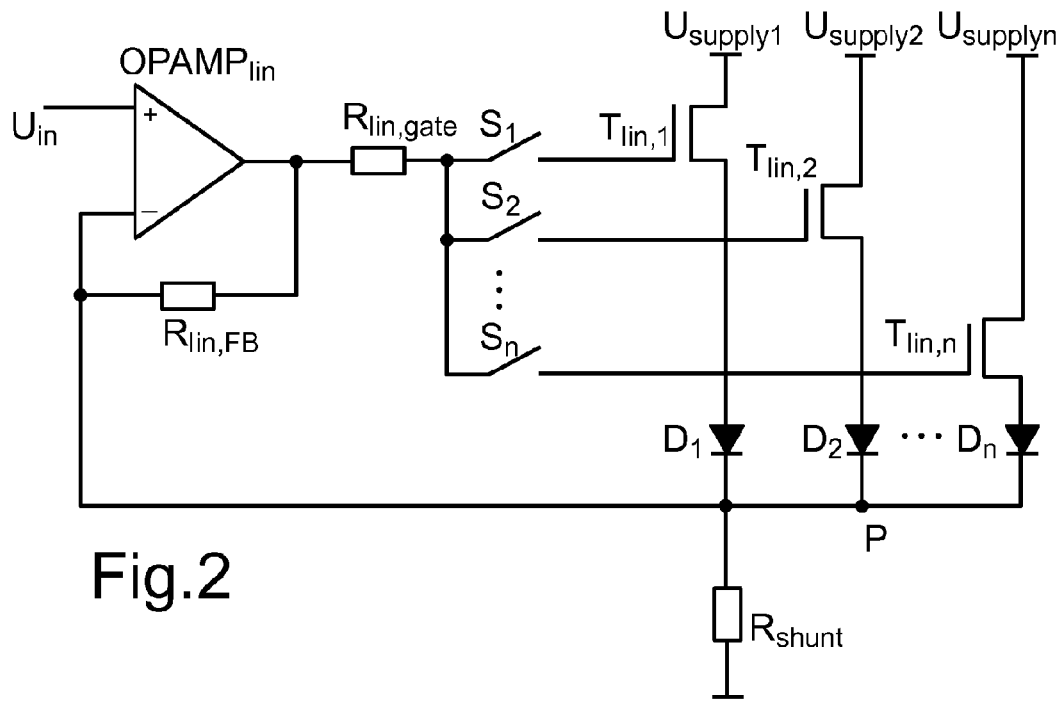
FIG. 2 shows a first exemplary embodiment of a circuit configuration according to the invention.
Figure 3:
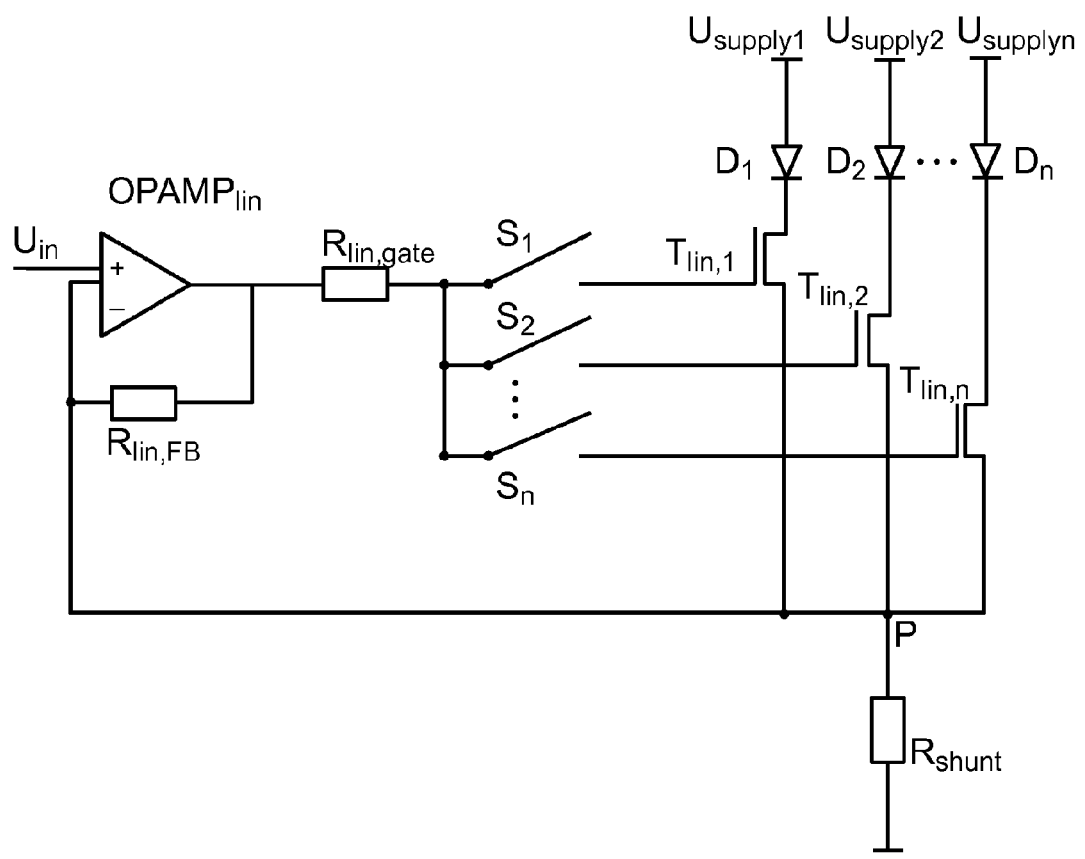
FIG. 3 shows a second exemplary embodiment of a circuit configuration according to the invention.

The reference characters introduced in regard to FIG. 1 are, insofar as they concern the same or similar components, also used for the embodiments represented in FIGS. 2 and 3. Said reference characters are therefore not reintroduced, rather the differences with respect to the generic circuit configuration are merely elaborated upon.

In the first exemplary embodiment of a circuit configuration according to the invention, illustrated in FIG. 2, the cathodes of the diodes $D_1$ to $D_n$ are connected to one another forming a connection point P. The working electrode-reference electrode path of a power transistor $T_{lin,1}$ to $T_{lin,n}$ is arranged between the anode of each diode $D_1$ to $D_n$ and a connection for a supply voltage $U_{supply1}$ to $U_{supplyn}$ associated with the respective diode. The control electrode of each power transistor $T_{lin,1}$ to $T_{lin,n}$ can be coupled to the output of the operational amplifier $OPAMP_{lin}$ of the linear regulator by way of a respectively associated switch $S_1$ to $S_n$. A control device (not shown) controls the switches $S_1$ to $S_n$ sequentially as required. The switches $S_1$ to $S_n$ are implemented as small signal transistors.

FIG. 3 shows a schematic representation of a second embodiment of a circuit configuration according to the invention, in which the diodes $D_1$ to $D_n$ are arranged between a respectively associated connection for a supply voltage $U_{supply1}$ to $U_{supplyn}$ and the working electrode of the respectively associated power transistor $T_{lin,1}$ to $T_{lin,n}$. If the anodes of the diodes $D_1$ to $D_n$ are coupled to a common supply voltage, in other words $U_{supply1}$ to $U_{supplyn}$ are identical, then a so-called common-anode configuration is produced. By preference, different supply voltages $U_{supply1}$ to $U_{supplyn}$ which are matched to the forward voltage of the respective diode $D_1$ to $D_n$ are however coupled to the connections.

The LEDs $D_1$ to $D_n$ represented as single diodes for reasons for clarity can naturally represent entire LED arrays each having a plurality of light-emitting diodes.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A circuit configuration for operating at least one first light emitting diode and one second light emitting diode, the circuit configuration comprising:
   an operational amplifier having a plus input and a minus input and an output;
   a device providing a target value and coupled to the plus input of the operational amplifier;

at least one first connection and one second connection for the first light emitting diode and one first connection and one second connection for the second light emitting diode, whereby the respective first connection is coupled to a connection for a DC supply voltage, whereby the respective second connections are coupled to each other, forming a connection point; and a current sensing resistor coupled in series between the connection point of the second connections and a reference potential, whereby the voltage drop across the current sensing resistor is coupled to the minus input of the operational amplifier;

a first transistor which can be driven in an analog manner, having a control electrode, a reference electrode and a working electrode, the working electrode-reference electrode path of which is coupled in series to the first connection and second connection for the first light emitting diode between a connection for a DC supply voltage and the reference potential;

a second transistor which can be driven in an analog manner, having a control electrode, a reference electrode and a working electrode, the working electrode-reference electrode path of which is coupled in series to the first connection and second connection for the second light emitting diode between a connection for a DC supply voltage and the reference potential;

a first electronic switch which is coupled in series between the output of the operational amplifier and the control electrode of the first transistor which can be driven in an analog manner; and a second electronic switch which is coupled in series between the output of the operational amplifier and the control electrode of the second transistor which can be driven in an analog manner.

2. The circuit configuration as claimed in claim 1, wherein the first light emitting diode is coupled between the reference electrode of the first transistor which can be driven in an analog manner and the reference potential and the second light emitting diode is coupled between the reference electrode of the second transistor which can be driven in an analog manner and the reference potential.

3. The circuit configuration as claimed in claim 1, wherein the first light emitting diode is coupled between a connection for a supply voltage and the working electrode of the first transistor which can be driven in an analog manner and the second light emitting diode is coupled between a connection for a supply voltage and the working electrode of the second transistor which can be driven in an analog manner.

4. The circuit configuration as claimed in claim 1, wherein at least one of the first electronic switch and the second electronic switch is implemented as a small signal transistor.

5. The circuit configuration as claimed in claim 1, wherein at least one of the first transistor and the second transistor which can be driven in an analog manner is implemented as a power transistor.

6. The circuit configuration as claimed in claim 1, wherein the first transistor and the second transistor which can be driven in an analog manner are mounted spaced apart by more than 2 cm.

7. The circuit configuration as claimed in claim 1, wherein a feedback network is coupled between the output and the minus input of the operational amplifier.

8. The circuit configuration as claimed in claim 1, wherein at least two connections for connecting a DC supply voltage are coupled to each other.

9. The circuit configuration as claimed in claim 1, wherein at least two connections for connecting a DC supply voltage are not coupled to each other, with the result that they can be coupled to different DC supply voltages.

10. The circuit configuration as claimed in claim 1, wherein the at least one first light emitting diode constitutes a first light emitting diode module and the at least one second light emitting diode constitutes a second light emitting diode module.

11. The circuit configuration as claimed in claim 10, wherein
at least one light emitting diode module comprises a plurality of single chips each having at least one light emitting diode which are connected at least one of in parallel and in series.

12. A method for operating at least one first light emitting diode and one second light emitting diode in a circuit configuration having an operational amplifier having a plus input and a minus input and an output; a device providing a target value and coupled to the plus input of the operational amplifier; at least one first connection and one second connection for the first light emitting diode and one first connection and one second connection for the second light emitting diode, whereby the respective first connection is coupled to a connection for a DC supply voltage, whereby the respective second connections are coupled to each other, forming a connection point and a current sensing resistor coupled in series between the connection point of the second connections and a reference potential, whereby the voltage drop across the current sensing resistor is coupled to the minus input of the operational amplifier;

the method comprising:
coupling the working electrode-reference electrode path of a first transistor which can be driven in an analog manner, which has a control electrode, a reference electrode and a working electrode, in series to the first connection and second connection for the first light emitting diode between a connection for a DC supply voltage and the reference potential;

coupling the working electrode-reference electrode path of a second transistor which can be driven in an analog manner, which has a control electrode, a reference electrode and a working electrode, in series to the first connection and second connection for the second light emitting diode between a connection for a DC supply voltage and the reference potential;

coupling a first electronic switch in series between the output of the operational amplifier and the control electrode of the first transistor which can be driven in an analog manner; and coupling a second electronic switch in series between the output of the operational amplifier and the control electrode of the second transistor which can be driven in an analog manner.

13. The circuit configuration as claimed in claim 6, wherein the first transistor and the second transistor which can be driven in an analog manner are mounted spaced apart by more than 5 cm.

* * * * *